US012557946B2

(12) United States Patent
Fan et al.

(10) Patent No.: US 12,557,946 B2
(45) Date of Patent: Feb. 24, 2026

(54) TOWEL HEATING DEVICE

(71) Applicant: Guangzhou Hansong Tuojiang Technology Co., Ltd., Guangzhou (CN)

(72) Inventors: Zhilin Fan, Guangzhou (CN); Zhenji Lin, Guangzhou (CN)

(73) Assignee: Guangzhou Hansong Tuojiang Technology Co., Ltd., Guangzhou (CN)

( * ) Notice: Subject to any disclaimer, the term of this patent is extended or adjusted under 35 U.S.C. 154(b) by 0 days.

(21) Appl. No.: 19/216,853

(22) Filed: May 23, 2025

(65) Prior Publication Data

US 2025/0281006 A1 Sep. 11, 2025

Related U.S. Application Data

(63) Continuation-in-part of application No. 18/763,632, filed on Jul. 3, 2024, now Pat. No. 12,329,326, and a (Continued)

(30) Foreign Application Priority Data

Mar. 7, 2024 (CN) ......................... 202410260988.9
Mar. 7, 2024 (CN) ......................... 202420441375.0
Apr. 25, 2025 (CN) ......................... 202520812692.3

(51) Int. Cl.
*A47K 10/06* (2006.01)
*A47K 10/02* (2006.01)

(Continued)

(52) U.S. Cl.
CPC ............ *A47K 10/025* (2013.01); *F26B 9/003* (2013.01); *F26B 23/06* (2013.01); *A47K 10/06* (2013.01)

(58) Field of Classification Search
CPC ........ A47K 10/00; A47K 10/06; A47K 10/16; A47K 10/24; A45C 15/00; A45C 3/001;

(Continued)

(56) References Cited

U.S. PATENT DOCUMENTS 2,728,996 A * 1/1956 Mason .................. A47K 10/06 392/382
2004/0093758 A1* 5/2004 Miller ..................... D06F 58/14 34/201

(Continued)

*Primary Examiner* — Sang Y Paik

(57) ABSTRACT

A towel heating device includes two body members, a foldable assembly, and a heating assembly. The two body members are arranged opposite to each other. A direction of a movement of the two body members close to or away from each other is defined as a folding/unfolding direction. The foldable assembly includes a flexible wrapping member and a plurality of support members. The flexible wrapping member is connected to the two body members. The support members are encased in the flexible wrapping member. A hardness of the support members is greater than a hardness of the flexible wrapping member. The support members are distributed along the folding/unfolding direction. A folding gap is defined between adjacent support members. The flexible wrapping member is bendable at the folding gap. The heating assembly is distributed on at least one of the foldable assembly and the two body members.

18 Claims, 12 Drawing Sheets

Related U.S. Application Data continuation-in-part of application No. 18/763,734, filed on Jul. 3, 2024.

(51) Int. Cl.
*F26B 9/00* (2006.01)
*F26B 23/06* (2006.01)

(58) Field of Classification Search
CPC ......... A45C 7/0095; H05B 3/34; F26B 9/003; F26B 23/06
USPC ......... 219/385, 386, 402–411, 521, 528, 529
See application file for complete search history.

(56) References Cited

U.S. PATENT DOCUMENTS

| | | | | |
|---|---|---|---|---|
| 2013/0153560 | A1* | 6/2013 | Lev | H05B 3/34<br>219/385 |
| 2018/0086021 | A1* | 3/2018 | Bélanger | B65D 5/5095 |
| 2023/0055540 | A1* | 2/2023 | Bailey | E04B 1/8404 |

* cited by examiner

TOWEL HEATING DEVICE

CROSS-REFERENCE TO RELATED APPLICATIONS

The present application is a continuation-in-part application of: U.S. patent application Ser. No. 18/763,632, filed on Jul. 3, 2024, and U.S. patent application Ser. No. 18/763,734, filed on Jul. 3, 2024. The present application claims priorities of: the Chinese patent application No. 202410260988.9, filed on Mar. 7, 2024; the Chinese patent application No. 202420441375.0, filed on Mar. 7, 2024; and the Chinese patent application No. 202520812692.3, filed on Apr. 25, 2025. Contents of the above patent applications are incorporated herein by their entireties.

FIELD

The present disclosure relates to the field of bathroom appliances, and in particular to a towel heating device.

BACKGROUND

Some towel heating barrels in related art can be folded, but a folding part of these towel heating barrels is typically an entirely flexible structure without support, resulting in insufficient rigidity, thereby causing issues such as wall collapse or deformation when a towel is placed inside.

SUMMARY

A towel heating device is provided in the present disclosure. The towel heating device includes two body members, a foldable assembly, and a heating assembly. The two body members are arranged opposite to each other and capable of moving close to or away from each other. A direction of a movement of the two body members close to or away from each other is defined as a folding/unfolding direction. The foldable assembly includes a flexible wrapping member and a plurality of support members. The flexible wrapping member is connected to the two body members. The plurality of support members are encased in the flexible wrapping member. A hardness of the plurality of support members is greater than a hardness of the flexible wrapping member. The plurality of support members are distributed along the folding/unfolding direction. A folding gap is defined between adjacent support members. The flexible wrapping member is bendable at the folding gap. The heating assembly is distributed on at least one of the foldable assembly and the two body members.

BRIEF DESCRIPTION OF THE DRAWINGS

To provide a clearer illustration of the technical solutions in the embodiments of the present disclosure or in the related art, a brief introduction will be given to the drawings used in the description of the embodiments or the related art. It is obvious that the drawings described below are merely some embodiments of the present disclosure, and for those skilled in the art, other drawings can be obtained based on these drawings without creative efforts.

Figure 1:
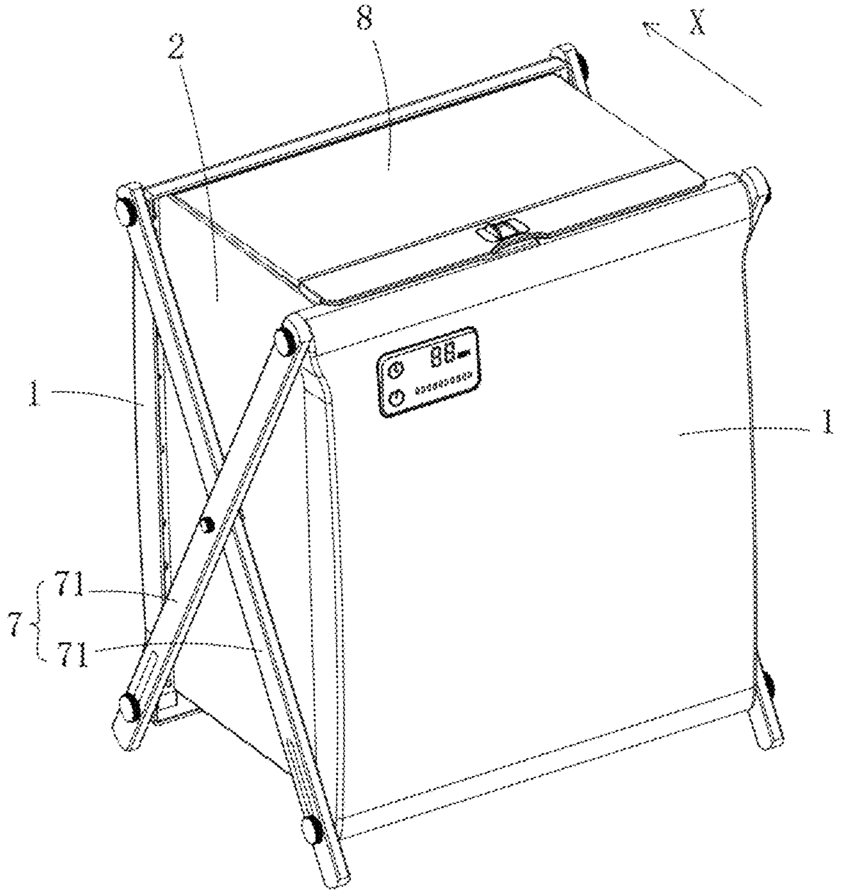
FIG. 1 is a schematic view of an overall structure of a towel heating device according to an embodiment of the present disclosure.

Wherein:

1—body member; 11—outer shell; 12—mounting frame; 100—heating cavity; 1001—side wall; 1002—bottom wall; 110—mounting cavity; 101—first body member; 102—second body member; 121—thermal insulation net;

2—foldable assembly; 21—flexible wrapping member; 22—support member; 211—inner fabric layer; 212—outer fabric layer; 221—first support member; 222—second support member; 223—third support member; 2001—folding gap; 2002—heat—pressing region; 2003—avoidance region; 2101—first section; 2102—second section; 2103—third section;

3—heating assembly; 31—control board; 32—flexible heating sheet; 33—heating plate; 321—thermal insulation layer; 322—heat conduction layer; 323—heating wire;

4—first connecting wire; 41—first end; 42—second end;

5—second connecting wire;

6—ground wire;

7—scissor bracket; 71—support leg;

8—cover;

X-folding/unfolding direction; Y-length direction of the flexible wrapping member.

DETAILED DESCRIPTION

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Referring to FIGS. 1 to 12, the present disclosure provides a towel heating device. The towel heating device includes two body members 1, a foldable assembly 2, and a heating assembly 3. The two body members 1 are arranged opposite to each other and are capable of moving close to or away from each other. A direction of a movement of the two body members 1 close to or away from each other is defined as a folding/unfolding direction X.

The foldable assembly 2 includes a flexible wrapping member 21 and a plurality of support members 22. The flexible wrapping member 21 is connected to the two body members 1. A shape of the flexible wrapping member 21 is not limited here. For example, three flexible wrapping members 21 may be provided. Specifically, one of the three flexible wrapping members 21 is connected to bottom ends of the two body members 1, another of the three flexible wrapping members 21 is connected to two opposite side ends of the two body members 1, and the other of the three flexible wrapping members 21 is connected to the other two opposite side ends of the two body members 1. Or, a single "U"-shaped flexible wrapping member 21 may be directly connected to the two body members 1. Specifically, an edge of the flexible wrapping member 21 is arranged with a connection portion, and the connection portion is secured to the two body members 1 via bolts.

Figure 4:
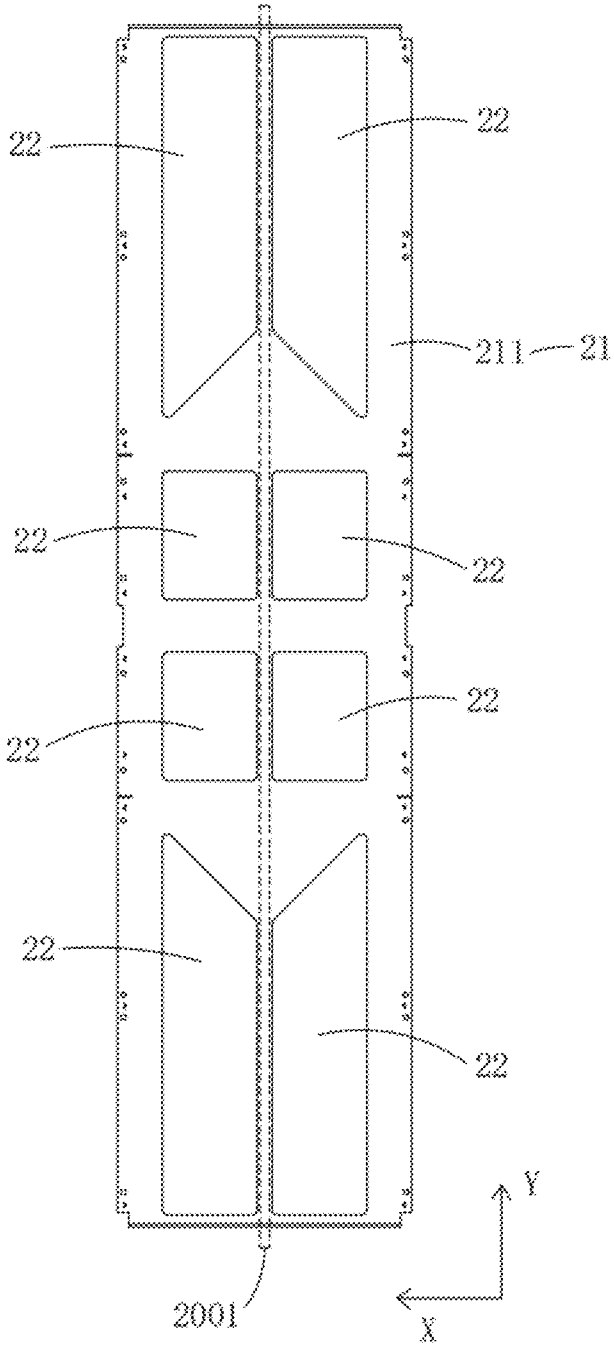
FIG. 4 is a distribution view of a plurality of support members in a flexible wrapping member according to an embodiment of the present disclosure.
Figure 5:
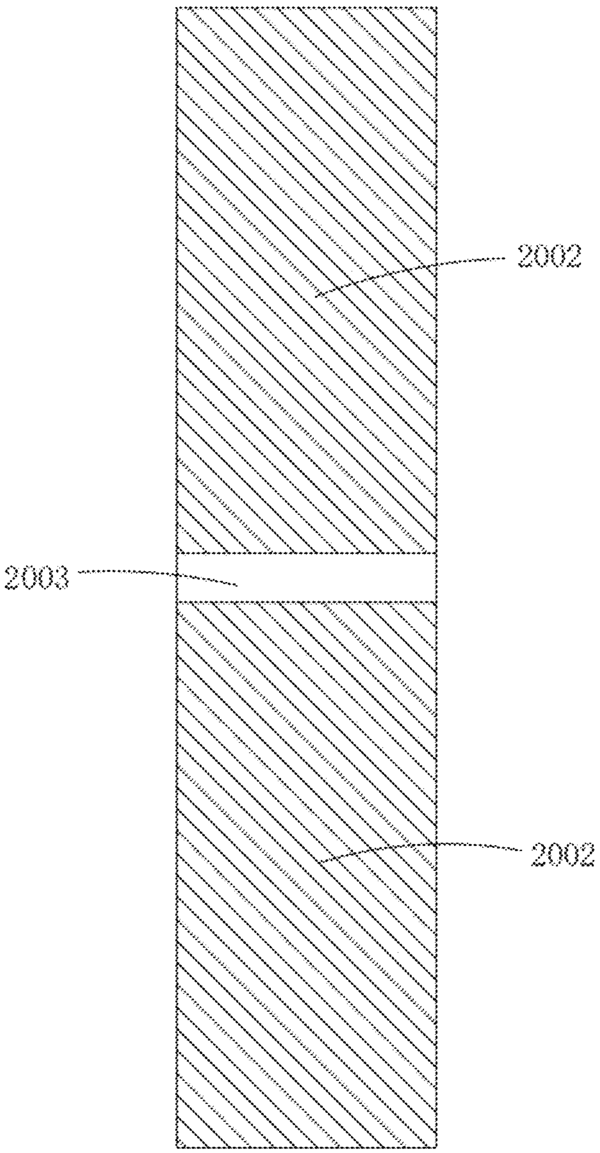
FIG. 5 is a distribution view of heat-pressing regions and an avoidance region according to an embodiment of the present disclosure.
Figure 7:
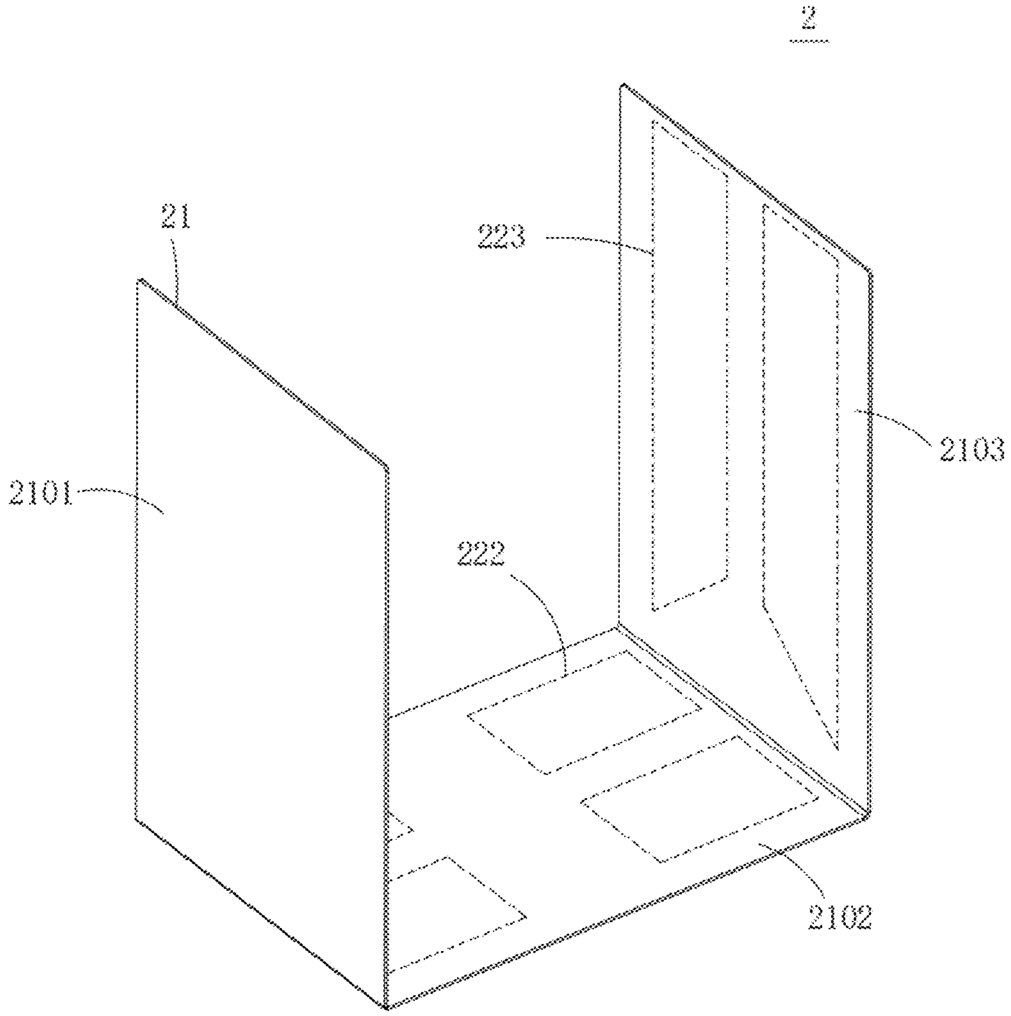
FIG. 7 is a structural view of a foldable assembly in an unfolded state according to an embodiment of the present disclosure.
Figure 8:
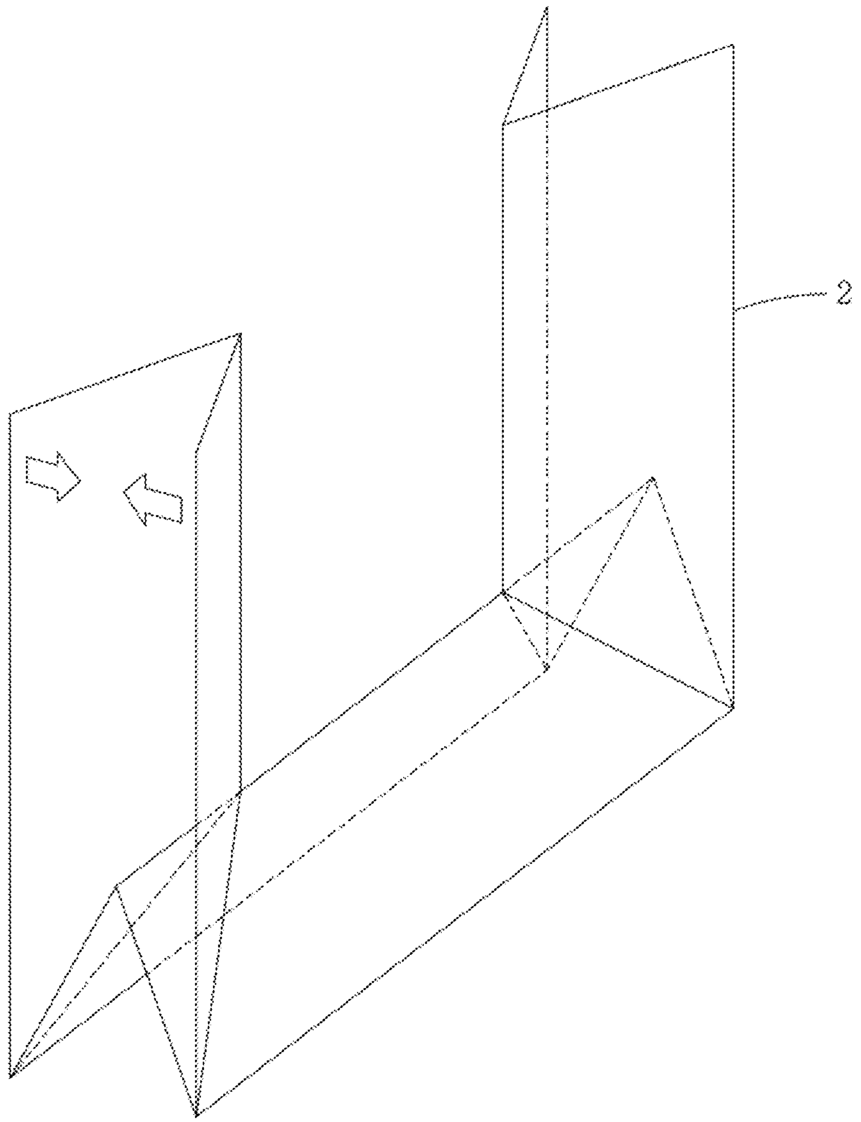
FIG. 8 is a structural view of the foldable assembly in a folded state according to an embodiment of the present disclosure.
Figure 9:
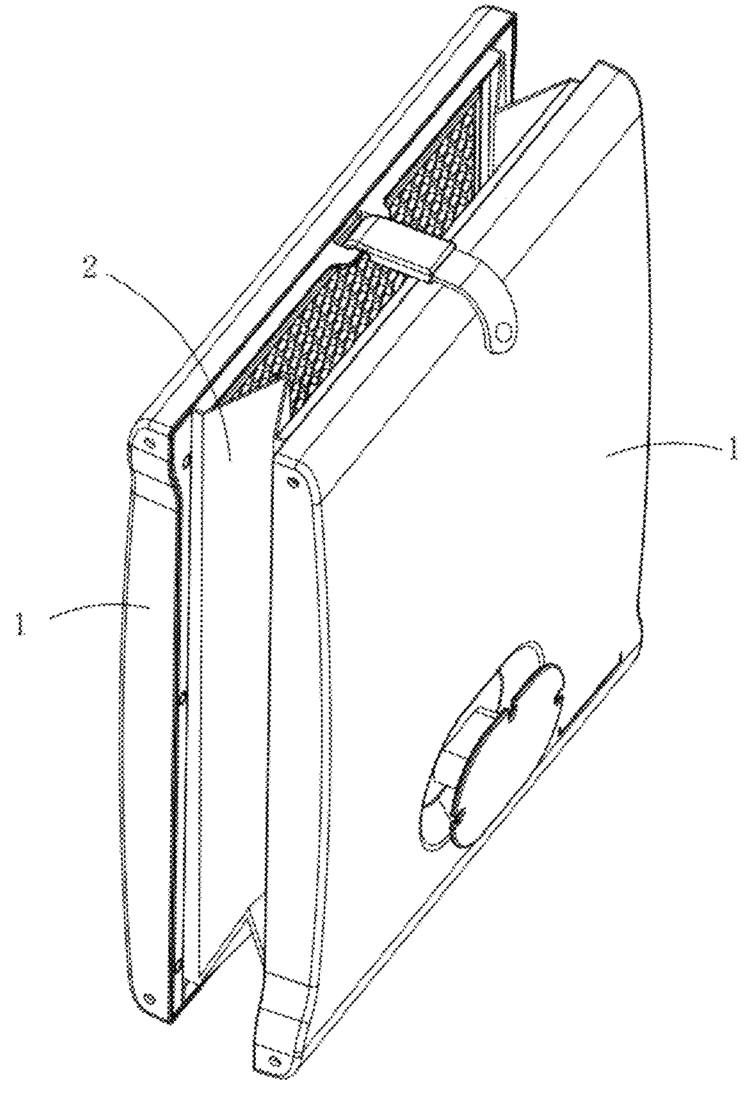
FIG. 9 is a schematic view of the foldable assembly in the folded state when two body members moves close to each other according to an embodiment of the present disclosure.
Figure 10:
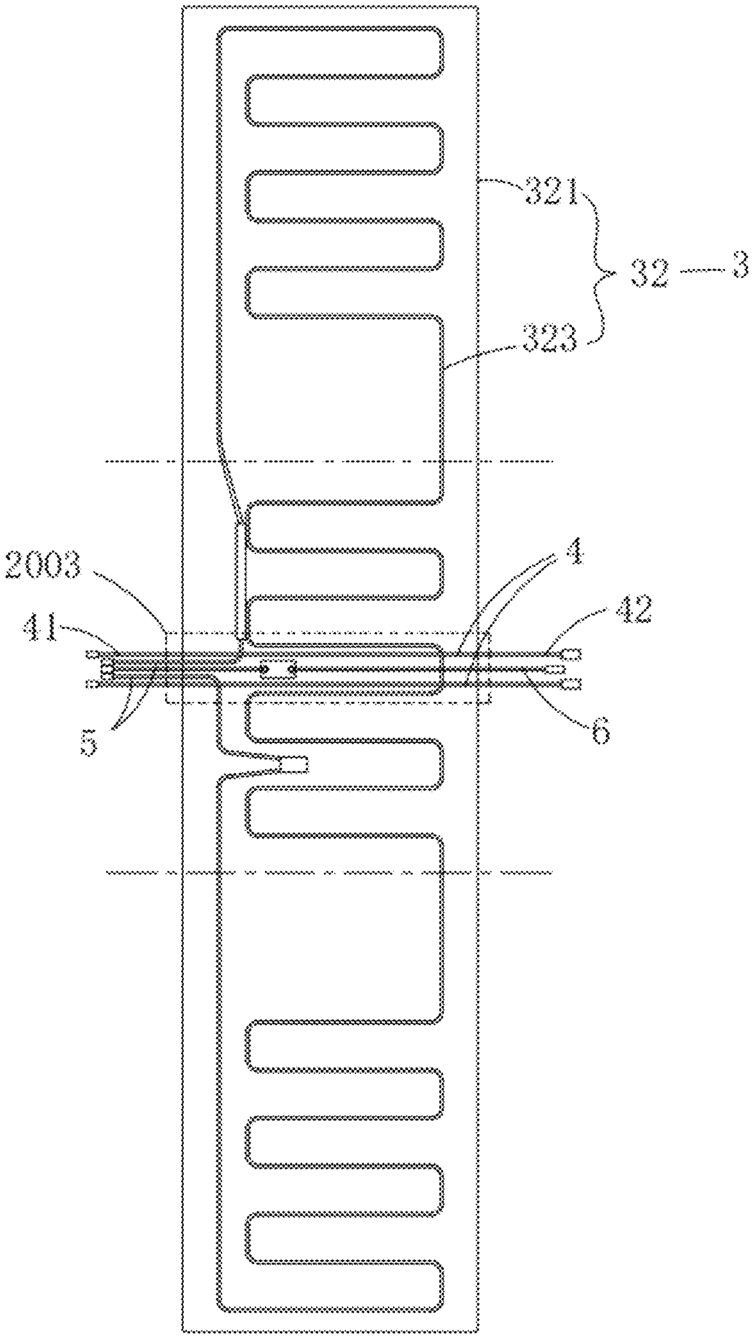
FIG. 10 is a structural view of a flexible heating sheet according to an embodiment of the present disclosure.

The support members 22 are encased in the flexible wrapping member 21. A hardness of the support members 22 is greater than a hardness of the flexible wrapping member 21, allowing the support members 22 to maintain the shape of the flexible wrapping member 21. Specifically, the support members 22 are attached to the flexible wrapping member 21 by adhesive bonding, heat pressing, or other methods to prevent displacement of the support members 22 relative to the flexible wrapping member 21. The plurality of support members 22 are distributed along the folding/unfolding direction X. A folding gap 2001 is defined between adjacent support members 22, enabling the flexible wrapping member 21 to bend at the folding gap 2001. As shown in FIGS. 1, 4, and 7, which show an unfolded state of the flexible wrapping member 21, when the two body members 1 move away from each other, the flexible wrapping member 21 is fully unfolded, and all support members 22 lie on a same plane. As shown in FIGS. 8 and 9, which show a folded state of the flexible wrapping member 21, when the two body members 1 move close to each other, the flexible wrapping member 21 bends at the folding gap 2001, causing the adjacent support members 22 (not shown in FIG. 8) in the folding/unfolding direction X to fold toward each other around the folding gap 2001. When the two body members 1 reach a closest position, the support members 22 overlap or substantially overlap in the folding/unfolding direction X.

The heating assembly 3 is distributed on the foldable assembly 2 and/or at least one of the body members 1. For example, the heating assembly 3 is distributed in the flexible wrapping member 21 and in the body members 1. The two body members 1 and the foldable assembly 2 cooperatively define a heating cavity 100 for placing towels or other items. The heating assembly 3 is configured to heat the heating cavity 100 and items in the heating cavity 100.

Thus, the support members 22 are arranged to maintain the shape of the foldable assembly 2 while allowing the foldable assembly 2 to bend at the folding gap 2001. In this way, the foldable assembly 2 remains rigid to prevent collapse or deformation can be ensured while retaining foldability of the foldable assembly 2.

As shown in FIG. 4, the folding/unfolding direction X is essentially a width direction of the flexible wrapping member 21, while the support members 22 also extend along a length direction Y of the flexible wrapping member 21. In this way, the support members 22 are allowed to be distributed over a larger area of the flexible wrapping member 21, providing support across an entire of the flexible wrapping member 21.

In some embodiments, the foldable assembly 2 includes a first section 2101, a second section 2102, and a third section 2103 sequentially connected to each other along the length direction Y of the flexible wrapping member 21. The first section 2101 and the second section 2102 can bend toward each other, and the second section 2102 and the third section 2103 can bend toward each other, forming the flexible wrapping member 21 to a "U" shape. The second section 2102 forms a bottom wall 1002 of the towel heating device corresponding to the heating cavity 100, while each of the first section 2101 and the third section 2103 forms a respective one of two opposite side walls 1001 of the towel heating device corresponding to the heating cavity 100. Each of the two body members 1 forms a respective one of the other two opposite side walls 1001 of the towel heating device corresponding to the heating cavity 100. That is, the two body members 1 and the foldable assembly 2 cooperatively define a heating cavity 100 with an open top, which can be covered by a cover 8 as shown in FIG. 1.

Figure 6:
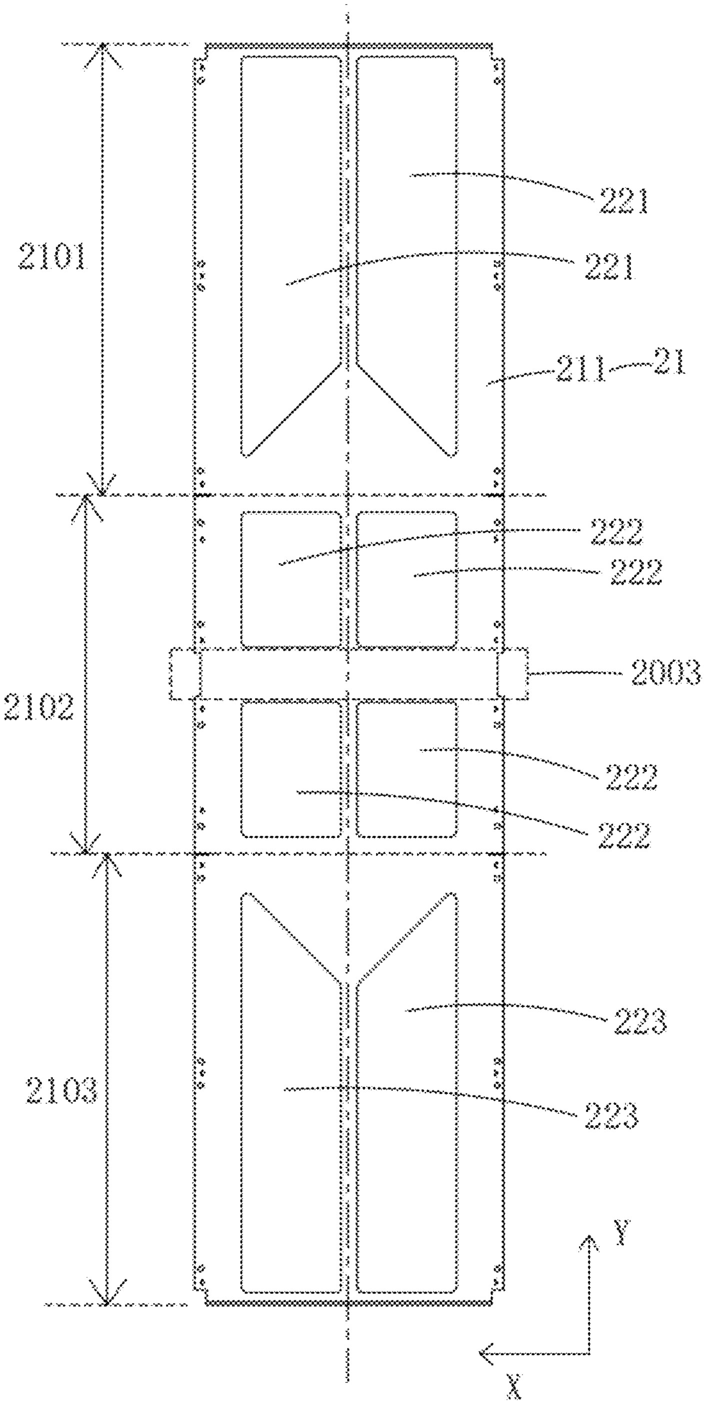
FIG. 6 is a distribution view of first support members, second support members, and third support members in the flexible wrapping member according to an embodiment of the present disclosure.

As shown in FIG. 6, the plurality of support members 22 include at least two first support members 221, at least two second support members 222, and at least two third support members 223. The at least two first support members 221 are distributed along the folding/unfolding direction X in the first section 2101, the at least two second support members 222 are distributed along the folding/unfolding direction X in the second section 2102, and the at least two third support members 223 are distributed along the folding/unfolding direction X in the third section 2103. Particularly, each of the support members 22 is an epoxy resin board, which has strong toughness and can undergo some elastic deformation, enhancing durability. Specifically, the first support members 221 are configured to support the first section 2101, the second support members 222 are configured to support the second section 2102, and third support members 223 are configured to support the third section 2103, reducing interference from the rigid support members 22 during a folding process of the flexible wrapping member 21 and providing space for deformation of the flexible wrapping member 21.

In some embodiments, the flexible wrapping member 21 includes an inner fabric layer 211 and an outer fabric layer 212. Each of the inner fabric layer 211 and the outer fabric layer 212 is an antibacterial fabric. The inner fabric layer 211 is arranged facing the heating cavity 100, and the outer fabric layer 212 is arranged facing away from the heating cavity 100.

Regarding the distribution of the heating assembly 3, in one embodiment, a heating component of the heating assembly 3 may be distributed only on the foldable assembly 2. Specifically, the heating assembly 3 includes a control board 31 and a flexible heating sheet 32. The control board 31 is a circuit board, and the flexible heating sheet 32 is electrically connected to the control board 31. The control board 31 is mounted on any of the body members 1 or the foldable assembly 2, particularly on one of the body members 1. The body member 1 may also be arranged with a control panel electrically connected to the control board 31, allowing users to adjust a working state of the flexible heating sheet 32 via the control panel. The flexible heating sheet 32 is mounted on the foldable assembly 2, specifically each of the flexible heating sheet 32 and the support members 22 is sandwiched between the inner fabric layer 211 and the outer fabric layer 212, and the support members 22 are located on a side of the flexible heating sheet 32 facing away from the heating cavity 100. In other words, the support members 22 are attached to the outer fabric layer 212, while the flexible heating sheet 32 is attached to the inner fabric layer 211.

Figure 11:
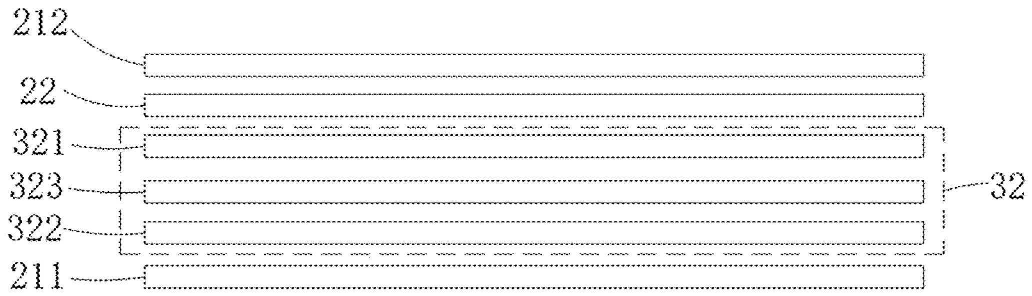
FIG. 11 is a layered structural view of the foldable assembly and the flexible heating sheet according to an embodiment of the present disclosure.

Referring to FIG. 11, the inner fabric layer 211, the outer fabric layer 212, the support members 22, and the flexible heating sheet 32 are attached to each other, and contact faces among the inner fabric layer 211, the outer fabric layer 212, the support members 22, and the flexible heating sheet 32 are fully fixed by adhesively bonded to secure positions of the flexible heating sheet 32 and the foldable assembly 2. Specifically, an outer side face of each support member 22 is fully bonded to the outer fabric layer 212, the other outer side face of the each support member 22 is fully bonded to the flexible heating sheet 32, and an outer side face of the flexible heating sheet 32 facing away from the support members 22 is fully bonded to the inner fabric layer 211. Particularly, the inner fabric layer 211, the outer fabric layer 212, the support members 22, and the flexible heating sheet 32 are connected to each other by heat pressing. In addition, edges of the inner fabric layer 211 and outer fabric layer 212 are stitched together to prevent the flexible wrapping member 21 from falling apart.

The flexible heating sheet 32 includes a thermal insulation layer 321, a heat conduction layer 322, and a heating wire 323. The thermal insulation layer 321 is connected to the support members 22, the heat conduction layer 322 is connected to the inner fabric layer 211, and the heating wire 323 is located between the thermal insulation layer 321 and the heat conduction layer 322. The thermal insulation layer 321, the heat conduction layer 322, and the heating wire 323 are adhesively bonded to each other. Specifically, the heat conduction layer 322 is an aluminum foil sheet, and heat generated by the heating wire 323 is conducted to a larger surface area of the aluminum foil sheet, which then disperses the heat into the heating cavity 100, improving heating efficiency. The thermal insulation layer 321 which is a thermal insulation cotton reduces a rate of heat loss from the heating cavity 100 to an outside.

Figure 2:
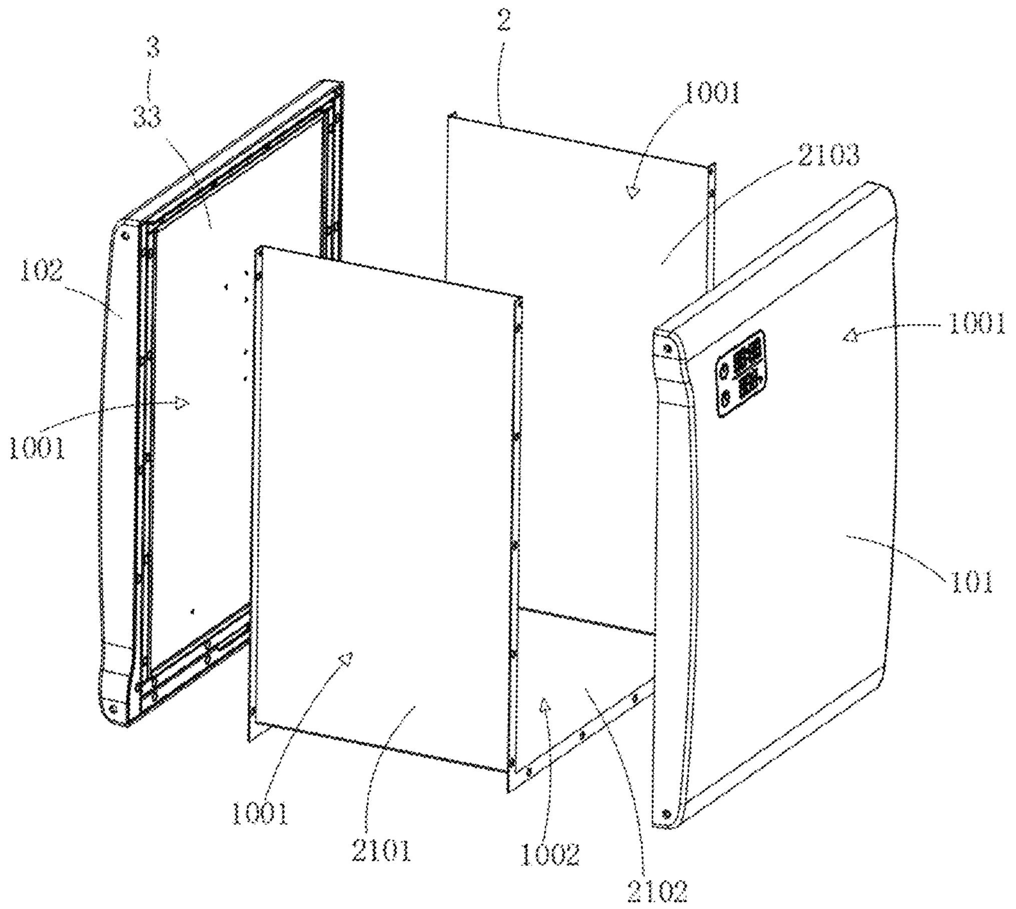
FIG. 2 is an exploded view of a partial structure of the towel heating device according to an embodiment of the present disclosure.
Figure 3:
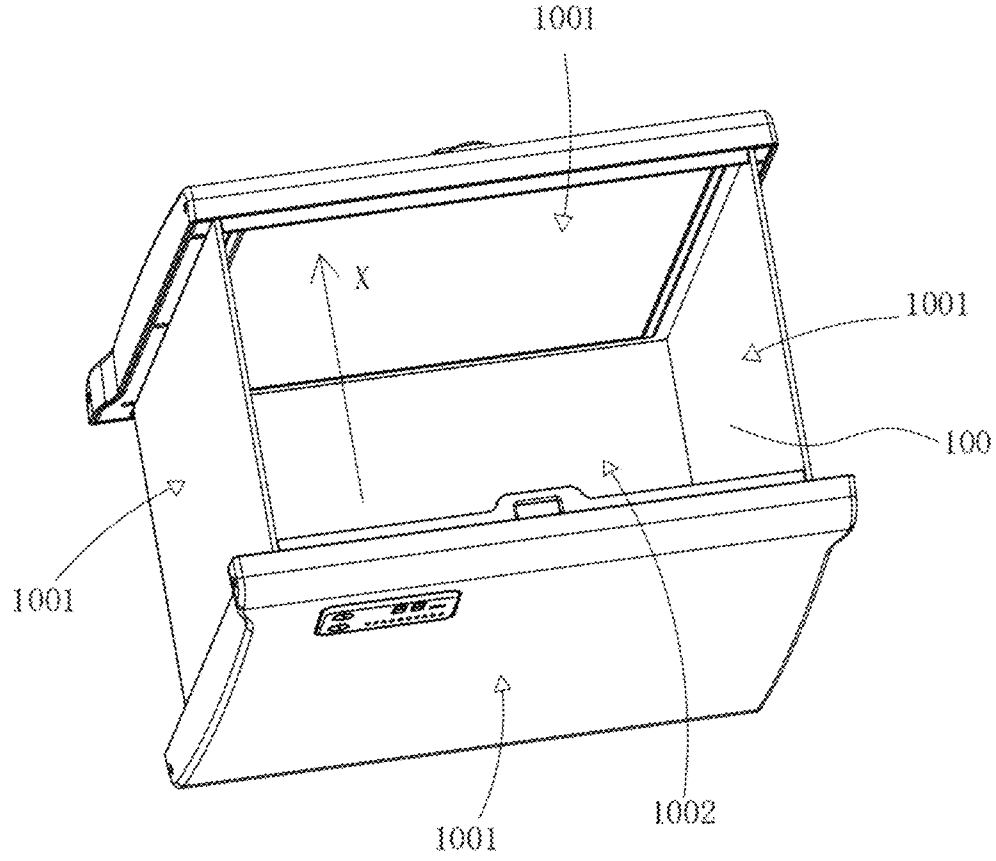
FIG. 3 is a structural view of the towel heating device according to an embodiment of the present disclosure, showing a heating cavity.
Figure 12:
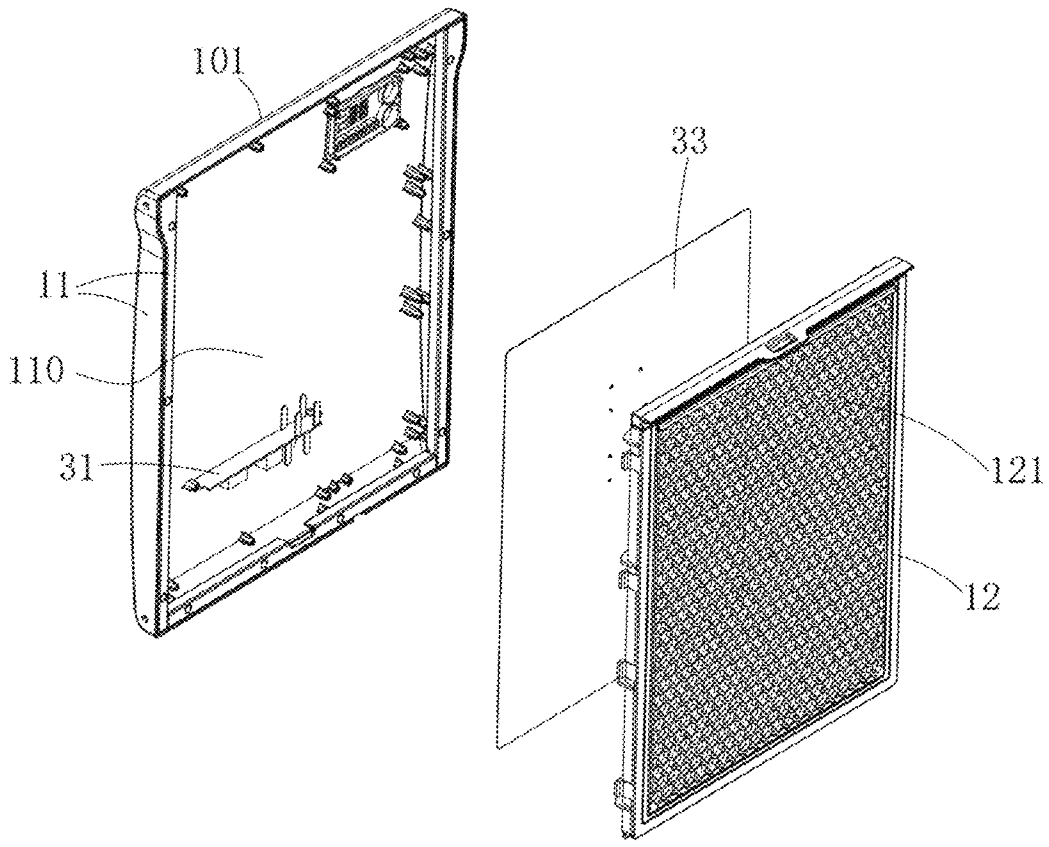
FIG. 12 is an exploded view of the body members according to an embodiment of the present disclosure.

Regarding the distribution of the heating assembly 3, in another embodiment, referring to FIGS. 2 and 12, the heating component of the heating assembly 3 may be distributed on both the foldable assembly 2 and the two body members 1. In addition to the components described in the previous embodiment, the heating assembly 3 further includes two heating plates 33. Each of the two heating plates 33 is mounted on a respective one of the two body members 1, and the two heating plates 33 are electrically connected to the control board 31. Each body member 1 includes an outer shell 11 and a mounting frame 12 mounted in the outer shell 11. The outer shell 11 defines a mounting cavity 110. The control board 31 is arranged in the mounting cavity 110, and the mounting frame 12 is configured to mount the heating plate 33. In addition, a thermal insulation net 121 may also be mounted on the mounting frame 12. The thermal insulation net 121 is arranged in a honeycomb structure and is located on a side of a corresponding heating plate 33 facing the heating cavity 100.

Specifically, the towel heating device further includes a first connecting wire 4. The first connecting wire 4 includes a first end 41 and a second end 42. The two body members 1 include a first body member 1011 and a second body member 1021. One of the two heating plates 33 is mounted on the first body member 1011, and the other of the two heating plates 33 is mounted on the second body member 1021. The control board 31 is mounted on the first body member 1011, and the heating plate 33 on the first body member 1011 is directly connected to the control board 31 via wires. The first end 41 of the first connecting wire 4 is connected to the control board 31 arranged on the first body member 1011, the first connecting wire 4 passes through the flexible wrapping member 21, and the second end 42 is connected to the heating plate 33 arranged on the second body member 1021, enabling the heating plate 33 arranged on the second body member 1021 to be electrically connected to the control board 31 via the first connecting wire 4.

Referring to FIGS. 5, 6, 7, and 10, since the flexible wrapping member 21, the flexible heating sheet 32, and the support members 22 are connected to each other by the heat pressing, the first connecting wire 4 needs to be protected from damage during the heat pressing process. Specifically, the foldable assembly 2 defines two heat-pressing regions 2002, and the flexible wrapping member 21, the support members 22, and the flexible heating sheet 32 are connected to each other by the heat pressing in the two heat-pressing regions 2002. An avoidance region 2003 is defined between the two heat-pressing regions 2002, meaning the avoidance region 2003 is a region free of the heat pressing process. The first connecting wire 4 is arranged to pass through the avoidance region 2003 to avoid the heat pressing damage.

Similarly, for an electrical connection between the heating wire 323 and the control board 31, the towel heating device further includes a second connecting wire 5. The heating wire 323 is electrically connected to the control board 31 via the second connecting wire 5. The second connecting wire 5 is also located in the avoidance region 2003 and may pass through the flexible wrapping member 21 to enter the body member 1 and connect the control board 31. Specifically, each of the heating wire 323, the second connecting wire 5, and the first connecting wire 4 is sandwiched between the thermal insulation layer 321 and the heat conduction layer 322. After the flexible heating sheet 32 is integrated to the flexible wrapping member 21, the first end 41 and the second end 42 of the first connecting wire 4 remain outside the flexible wrapping member 21. Once the flexible wrapping member 21 is connected to the two body members 1, the first end 41 and the second end 42 can then be connected accordingly. Each of the first connecting wire 4 and the second connecting wire 5 is essentially an electrical wire.

Additionally, a ground wire 6 may pass through the avoidance region 2003. One end of the ground wire 6 is connected to a grounding terminal of the heating plate 33 on the second body member 1021, and the other end of the ground wire 6 is connected to a grounding terminal of the heating plate 33 on the first body member 1011 and a grounding terminal of the control board 31.

As shown in FIG. 6, the support members 22 and the avoidance region 2003 are arranged correspondingly. Specifically, four second support members 222 are located on the bottom wall 1002 of the towel heating device corresponding to the heating cavity 100 and are distributed in a grid pattern. Intervals among the four second support members 222 along the length direction Y of the flexible wrapping member 21 form the avoidance region 2003, ensuring the first connecting wire 4 does not contact any support members 22 and maintaining flatness of the bottom wall 1002.

In some embodiments, as shown in FIG. 1, the towel heating device further includes a scissor bracket 7. The scissor bracket 7 is connected to the two body members 1. The scissor bracket 7 folds as the two body members 1 move close to each other or unfolds as the two body members 1 move away from each other. In this embodiment, the two body members 1 and the foldable assembly 2 are lifted off the ground by the scissor bracket 7, preventing the fabric-based flexible wrapping member 21 from being soiled by ground moisture.

Specifically, the scissor bracket 7 includes two support legs 71 which are arranged crossed over each other. Each support leg 71 is connected the two body members 1. Each support leg 71 includes a rotating end and an adaptive end. The rotating end is rotatably connected to one of the two body members 1, while the adaptive end is both rotatably and slidably connected to the other of the two body members 1. In this way, mechanical support for a folding/unfolding motion of the scissor bracket 7 and the two body members 1 can be provided. Particularly, each support leg 71 is made of a bamboo material, which is more durable and cost-effective.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. A towel heating device, comprising:

two body members, arranged opposite to each other and capable of moving close to or away from each other, wherein a direction of a movement of the two body members close to or away from each other is defined as a folding/unfolding direction;

a foldable assembly, comprising a flexible wrapping member and a plurality of support members, wherein the flexible wrapping member is connected to the two body members, the plurality of support members are encased in the flexible wrapping member, and a hardness of the plurality of support members is greater than a hardness of the flexible wrapping member; the plurality of support members are distributed along the folding/unfolding direction, a folding gap is defined between adjacent support members, and the flexible wrapping member is bendable at the folding gap;

a heating assembly, distributed on at least one of the foldable assembly and the two body members;

wherein the heating assembly comprises a control board and heating members configured to generate heat, the control board is electrically connected to the heating members via connecting wires; the connecting wires pass through a space formed between the adjacent support members.

2. The towel heating device according to claim 1, wherein the plurality of support members extend along a length direction of the flexible wrapping member.

3. The towel heating device according to claim 2, wherein the two body members and the flexible wrapping member cooperatively define a heating cavity, the flexible wrapping member comprises a first section, a second section, and a third section sequentially connected to each other along the length direction, the first section and the second section are bendable toward each other, and the second section and the third section are bendable toward each other; each of the first section and the third section forms a respective one of two opposite side walls of the towel heating device corresponding to the heating cavity, and the second section forms a bottom wall of the towel heating device corresponding to the heating cavity;

the plurality of support members comprise at least two first support members, at least two second support members, and at least two third support members, the at least two first support members are distributed along the folding/unfolding direction in the first section, the at least two second support members are distributed along the folding/unfolding direction in the second section, and the at least two third support members are distributed along the folding/unfolding direction in the third section.

4. The towel heating device according to claim 1, wherein the heating members of the heating assembly comprise a flexible heating sheet, the control board is mounted on any of the two body members and the foldable assembly, the flexible heating sheet is mounted on the foldable assembly, and the flexible heating sheet is electrically connected to the control board.

5. The towel heating device according to claim 4, wherein the two body members comprises a first body member and a second body member, and the control board is mounted on the first body member;

the heating members of the heating assembly further comprises two heating plates, one of the two heating plates is mounted on the first body member, the other of the two heating plates is mounted on the second body member, and each of the two heating plates is electrically connected to the control board;

the connecting wires comprise a first connecting wire, the first connecting wire comprises a first end and a second end, the first end is connected to the control board arranged on the first body member, the first connecting wire passes through the flexible wrapping member, and the second end is connected to the other of the two heating plates arranged on the second body member, and the other of the two heating plates arranged on the second body member is electrically connected to the control board via the first connecting wire.

6. The towel heating device according to claim 5, wherein the foldable assembly defines two heat-pressing regions, the flexible wrapping member, the support members, and the flexible heating sheet are connected to each other by heat pressing in the two heat-pressing regions, an avoidance region is defined between the two heat-pressing regions, and the first connecting wire passes through the avoidance region.

7. The towel heating device according to claim 6, wherein the connecting wires further comprises a second connecting wire, wherein the flexible heating sheet is electrically connected to the control board via the second connecting wire, and the second connecting wire is located in the avoidance region.

8. The towel heating device according to claim 7, wherein the flexible heating sheet comprises a thermal insulation layer, a heat conduction layer, and a heating wire, the second connecting wire is connected to the heating wire, and each of the heating wire, the second connecting wire, and the first connecting wire is sandwiched between the thermal insulation layer and the heat conduction layer.

9. The towel heating device according to claim 6, wherein the two body members and the flexible wrapping member cooperatively define a heating cavity, the flexible wrapping member comprises a first section, a second section, and a third section sequentially connected to each other along a length direction of the flexible wrapping member, the first section and the second section are bendable toward each other, and the second section and the third section are bendable toward each other; each of the first section and the third section forms a respective one of two opposite side walls of the towel heating device corresponding to the heating cavity, and the second section forms a bottom wall of the towel heating device corresponding to the heating cavity;

the plurality of support members comprise at least two first support members, at least two second support members, and at least two third support members, the at least two first support members are distributed along the folding/unfolding direction in the first section, the at least two second support members are distributed along the folding/unfolding direction in the second section, and the at least two third support members are distributed along the folding/unfolding direction in the third section;

the number of the at least two second support members in the second section is four, the four second support members are arranged in a grid pattern, and intervals among the four second support members along the length direction of the flexible wrapping member form the avoidance region.

10. The towel heating device according to claim 1, further comprising a scissor bracket, wherein the scissor bracket is connected to the two body members and folds as the two body members move close to each other or unfolds as the two body members move away from each other.

11. The towel heating device according to claim 10, wherein the scissor bracket comprises two support legs arranged crossed over each other, each of the two support legs is connected to the two body members, and the each of the two support legs is made of a bamboo material.

12. A towel heating device comprising:

two body members, arranged opposite to each other and capable of moving close to or away from each other, wherein a direction of a movement of the two body members close to or away from each other is defined as a folding/unfolding direction;

a foldable assembly, comprising a flexible wrapping member and a plurality of support members, wherein the flexible wrapping member is connected to the two body members, the plurality of support members are encased in the flexible wrapping member, and a hardness of the plurality of support members is greater than a hardness of the flexible wrapping member; the plurality of support members are distributed along the folding/unfolding direction, a folding gap is defined between adjacent support members, and the flexible wrapping member is bendable at the folding gap; and a heating assembly, distributed on at least one of the foldable assembly and the two body members;

wherein the two body members and the flexible wrapping member cooperatively define a heating cavity;

the flexible wrapping member comprises an inner fabric layer and an outer fabric layer, the inner fabric layer is arranged facing the heating cavity, the outer fabric layer is arranged facing away from the heating cavity, and each of the flexible heating sheet and the plurality of support members is sandwiched between the inner fabric layer and the outer fabric layer.

13. The towel heating device according to claim 12, wherein the plurality of support members are located on a side of the flexible heating sheet facing away from the heating cavity.

14. The towel heating device according to claim 12, wherein the inner fabric layer, the outer fabric layer, the plurality of support members, and the flexible heating sheet are attached to each other, and contact faces among the inner fabric layer, the outer fabric layer, the plurality of support members, and the flexible heating sheet are fully bonded and fixed.

15. The towel heating device according to claim 14, wherein the inner fabric layer, the outer fabric layer, the plurality of support members, and the flexible heating sheet are connected to each other by heat pressing.

16. The towel heating device according to claim 12, wherein the flexible heating sheet comprises a thermal insulation layer, a heat conduction layer, and a heating wire, the thermal insulation layer is connected to the plurality of support members, the heat conduction layer is connected to the inner fabric layer, and the heating wire is sandwiched between the thermal insulation layer and the heat conduction layer.

17. The towel heating device according to claim 16, wherein the thermal insulation layer, the heat conduction layer, and the heating wire are adhesively bonded to each other.

18. The towel heating device according to claim 12, wherein each of the inner fabric layer and the outer fabric layer is an antibacterial fabric.

* * * * *